May 7, 1940. K. E. BEMIS 2,199,584
PROCESS OF COOKING MEATS
Filed April 19, 1938
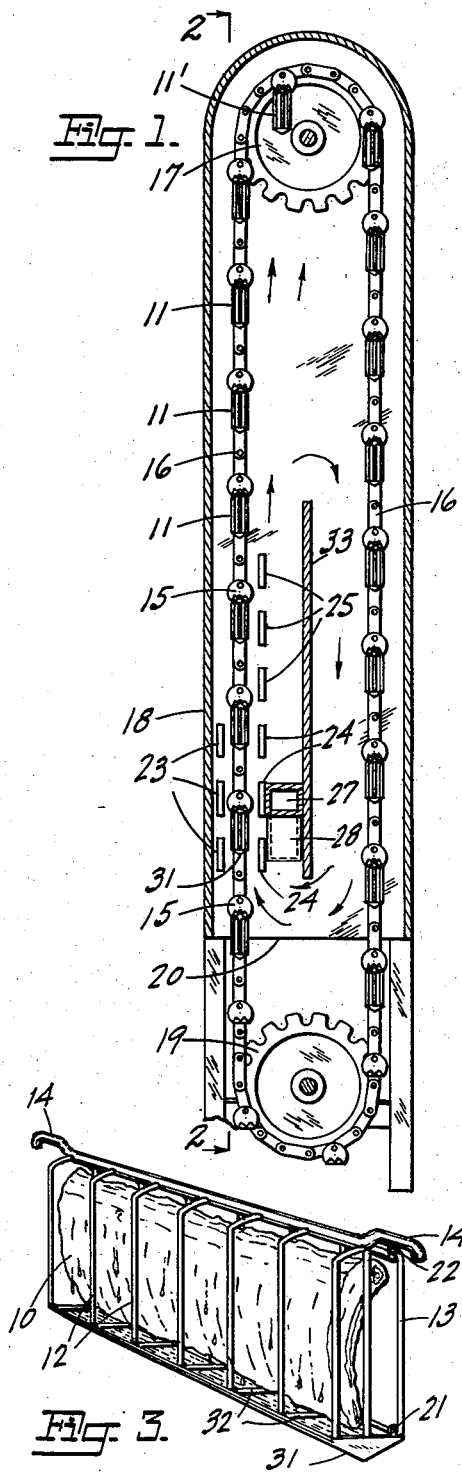
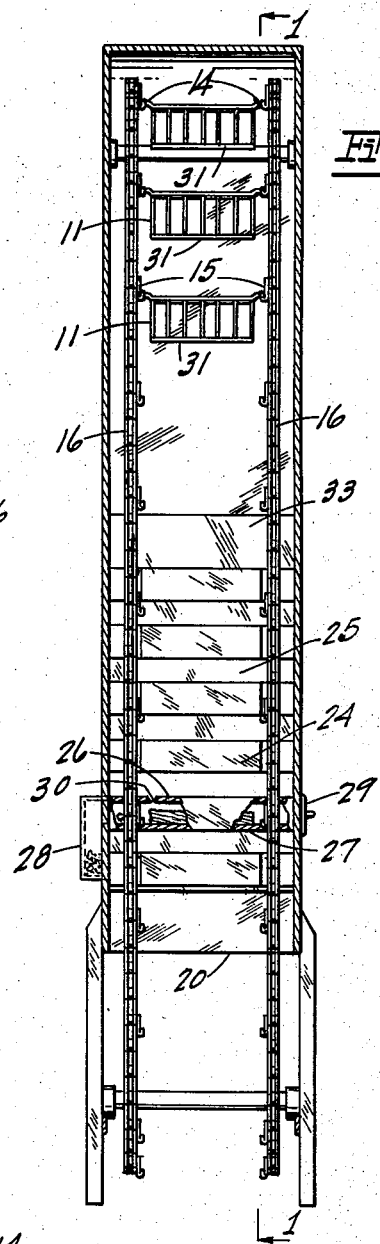
Inventor
Kenneth E. Bemis
By Philip R. Liedell
Attorney Patented May 7, 1940

2,199,584

UNITED STATES PATENT OFFICE 2,199,584

PROCESS OF COOKING MEATS

Kenneth E. Bemis, Oakland, Calif.

Application April 19, 1938, Serial No. 202,913

3 Claims. (Cl. 53—21)

This invention, a process of cooking meats, is adapted to all types of direct cooking processes, such as barbecuing, roasting, broiling, baking and frying, though primarily intended for barbecuing and roasting.

When meat is completely roasted, broiled or barbecued under a constant, intense temperature suitable for braising, the meat will be externally scorched or over-browned before the center becomes properly cooked, and, if such processes are conducted under a constant baking temperature without first braising or searing, the meat will shrink considerably in weight and volume through loss of juices in excess, and the meat will become dry, tough and stringy and the flavor considerably impaired.

For ordinary household operations, meat can be started at a high temperature for braising and the cooking can be continued by reducing the temperature of the oven; however, this method, unless two ovens are employed, one for high and the other for lower temperatures, is impractical and unsuitable for commercial or continuous production of cooked meats.

Ovens are usually made greater in horizontal than in vertical cross-section, and are regularly supplied with doors, flues, or vents, which contribute to losses of heat and variations in temperature during the cooking process, and which have a detrimental effect on the ultimate results.

In continuous meat cooking processes, the meat is either laid in a pan and allowed to cook in the juices which gather in the pan, or when carried by supports instead of a pan, the juices exuded from the meat are permitted to drip onto other portions of meat therebelow or go to waste.

The above facts are presented for the purpose of substantiating the advantages and variations in the process forming the subject matter of this invention from known processes. The objects and advantages of the invention are: First; to provide a new process of cooking meats which overcomes all of the disadvantages of previous systems, and produces a more juicy and delectable product of greater relative volume and weight.

Second; to provide a process as outlined in which the meat is preferably cut in substantially thin sections of an inch or less, seasoned, and carried edgewise vertically between heating units which initially deliver an intense braising heat simultaneously to both sides of the meat, to coincidently seal the cells on both sides, and the cooking then continued in heat derived from the heating units by circulation in which the zone of braising and direct radiant heat is limited to a minor portion of the path of travel of the meat.

Third; to carry the cooking to completion in the same oven and admit and discharge the meat through the bottom of the oven which otherwise is free of openings, doors, or flues, so that all heat is thermally confined therein.

Fourth; to provide a baffle to isolate the remainder of the circulatory path from the portion in which the heating units are located on both sides of the path of travel whereby the heat will circulate within, and be confined to the oven interior.

Fifth; to provide a process in which the meat is carried edgewise to present successively, the top, then both sides simultaneously, and finally the bottom, surfaces of the meat to an intense braising heat and continue and conclude the cooking in a thermally-confined volume of circulating air heated by circulation in a path including the locality of said braising heat and in which all juices exuded by the meat with the exception of such juices as are evaporated are caught and retained during the cooking process and which maintain a substantially saturated condition of the confined volume of circulating air to prevent the meat from drying out during the cooking process, in which the exuded unevaporated juices are maintained out of association with other cuts of meat by dripping or otherwise, or from associating with the portion from which it is derived to maintain and preserve the individual flavor of each portion without flavor contaminations from other portions.

Sixth; to provide a process in which burning or scalding of the hands of the operator is completely obviated, and as often occurs when meat is handled in ordinary ovens, and in which the cooking is conducted in a manner reducing weight and volume loss to an absolute minimum, and in which the meat is properly and uniformly cooked, juicy and delectable, and in which basting of the meat is entirely dispensed with.

In fully describing the process, reference will be had to the following drawing which illustrates a suitable structure for carrying out the process, and in which;

Fig. 1 is a sectional elevation through an oven which is particularly suited to this process, and corresponds to a section taken on line 1—1 of Fig. 2.

Fig. 2 is a section taken on line 2—2 of Fig. 1.

Fig. 3 is a perspective view of one of the meat carriers suitable for use with the process.

In this process, the meat, such as a slab of spare ribs 10, or a cut of meat preferably less than an inch in thickness, is placed edgewise or vertically in a holder or carrier 11 which has rear and front grid walls 12 and 13 respectively, and suitable suspensory supports 14 by which it is supported by suitable carrier attachments 15 which are pivotally connected to a vertical conveyor 16, which has its head sprocket 17 located within, and near the top of the vertical oven 18, and its lower sprocket 19 located below the bottom 20 of the oven, the carrier having its front grid hinged as indicated at 21, and provided with latching means 22; the space between the front and rear grids 13 and 12 being such as to firmly support the meat in its upright or edgewise position.

The meat is suitably seasoned and suspended in the carrier by the chains 16 on one pair of attachments 15 which are at the instant located below the bottom 20 of the oven, the heating units 23 and 24 located respectively on opposite sides of the path of travel defined by the upstrand of the chain 16 being energized, and, for meats which have an especially fat side, the fat braising heating units 25 located only on one side of the path of travel also being energized, and if the meat is to be barbecued, hickory or other suitable wood having been placed as indicated at 26 in the retort 27 which is sealed at one end by means of the refuse receiver 28 and by a door or plug 29 at the other end, the retort being heated to a destructive distillation temperature by direct association with heating units 24, and the smoke escaping from the retort into the oven through a minimum area slit, to permit escape of the smoke but preventing introduction of air for combustion, the slit being indicated at 30.

As the conveyor travels, the carrier 11 with its portion or cut of meat 10 is carried upwardly between the heating units 23, 24 for intense braising action first on the top, then simultaneously on both sides of the meat and finally on the bottom, to seal the cells on all surfaces, and, if there is an unusually fat side, is additionally braised in sequence by heating units 25 to cook additional grease or oil from the fat. The conveyor carries the meat about the path of travel in the direction of, and with the circulation of heated air.

The juices exuding from the meat drain down the sides of the meat into a receptacle 31 which forms the bottom of the carrier and which is provided with a grid cover 32 to keep the lower edge of the meat out of the juices.

A portion of the watery juices evaporates and saturates the heated air in the oven and serves to prevent further evaporation of juices from the meat, and thus the weight and volume of the meat is substantially maintained close to the original.

The heat from the heating units initially circulates upwardly, and due to the fact that the air on the back or down-travel side of the baffle 33 is of lower temperature, circulation of the heat is effected as indicated by the arrows, passing about the top and down the back and about the bottom of the baffle, forming the path of circulation which is confined entirely within the confines of the oven, the air then passing back up about the heating units for reheating. Thus a confined volume of air is circulated and derives its heat from the heating units, and direct radiant heat is limited to the locality of the heating units and is isolated from the remainder of the path of circulation.

The conveyor carries the meat up and over to the down travel side as indicated at 11', and down the other side of the baffle, the carrier being removed from the vertical conveyor when the carrier emerges from the bottom of the oven.

With this method, the meat is braised on both sides simultaneously with exactly equal temperatures, and which cannot be accomplished in any other way. If the meat should be passed between super-posed and sub-posed units while the meat was in a horizontal position, the degree of heat would not be equal on both sides of the meat, as the underside of the meat would be exposed to both radiant and circulatory heat with the meat forming a trap, and which would not occur on the top side.

In addition, the meat is completely cooked without any basting whatever, and the meat retains its juiciness due to the entrapment of the saturated air in the oven and its circulation confined to the interior of the oven.

The following copending applications are related to this process; Serial Number 181,517, filed December 24, 1937, for Barbecue furnace; Serial Number 244,449, filed December 7, 1938, for Method of preparing a meat product.

It will be understood that variations in construction and arrangement of equipment, and in the steps of the process, which variations are consistent with the appended claims, may be resorted to without detracting from the spirit or scope of the invention, or sacrificing any of the advantages thereof.

I claim:

1. The process of cooking meats consisting in presenting portions of meat supported in a vertical position between sources of direct heat for radiant heat braising action simultaneously and equally on both sides and successively on the top and bottom edges of the meat creating circulation of a confined volume of air; and heating said air by said sources of direct heat during circulation and continuing the cooking process by moving said meat to a position isolated from said radiant direct heat and in the path of the confined circulation from the heating units and gradually moving said meat to positions of increasingly lower temperature until the cooking is completed.

2. The process of cooking meats consisting in supporting the meat edgewise with the most extensive surfaces in a vertical plane, and transporting the meat upwardly through a confined circulating atmosphere while initially subjecting the meat successively at the top, on both sides simultaneously, and on the bottom to opposed sources of intense radiant heat for braising the meat with equal intensity over its entire area; removing the meat from the area of radiant heat, and continuing the cooking process in the confined circulating atmosphere heated by means of heat derived from said sources by circulation.

3. The method of cooking meat consisting in thermally creating circulation of a thermally-confined volume of air and thereby creating a circulatory path; establishing a portion of said path between opposed sources of direct radiant heat and isolating the continuing remainder of said path from said direct radiant heat, thereby creating a path with maximum radiant heat conditions in said portion, and gradually-diminishing, non-radiant, circulatory heat in the remainder of said path; passing meat slowly about said path starting through said portion for intense braising action simultaneously on both sides of the meat continuing with non-radiant high temperature cooking and gradually decreasing to low temperature cooking, and removing the meat as it reaches the point of lowest temperature in the path.

KENNETH E. BEMIS.